United States Patent
Ito

(10) Patent No.: US 6,869,240 B2
(45) Date of Patent: Mar. 22, 2005

(54) KEYBOARD INPUT DEVICE

(75) Inventor: Hideki Ito, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 211 days.

(21) Appl. No.: 10/378,765

(22) Filed: Mar. 3, 2003

(65) Prior Publication Data
US 2004/0201606 A1 Oct. 14, 2004

(30) Foreign Application Priority Data
Mar. 4, 2002 (JP) ......................................... 2002-058076

(51) Int. Cl.⁷ ................................................. G06F 1/16
(52) U.S. Cl. .................... 400/490; 400/491.3; 200/5 A; 200/6 A; 200/6 R; 361/680
(58) Field of Search ............................. 400/490, 491.1, 400/491.2, 491.3, 472; 361/680, 681, 683; 200/5 A, 6 A, 6 R

(56) References Cited

U.S. PATENT DOCUMENTS

| | | | |
|---|---|---|---|
| 5,708,562 A | | 1/1998 | Agata et al. |
| 6,068,417 A | * | 5/2000 | Butler .......................... 400/492 |
| 6,375,372 B1 | * | 4/2002 | Tsau ............................ 400/490 |
| 6,613,990 B2 | * | 9/2003 | Kawasaki .................... 200/6 A |
| 6,781,819 B2 | * | 8/2004 | Yang et al. .................. 361/680 |

* cited by examiner

Primary Examiner—Ren Yan
Assistant Examiner—Dave A. Ghatt
(74) Attorney, Agent, or Firm—Brinks Hofer Gilson & Lione

(57) ABSTRACT

A keyboard input device equipped with a pointing device featuring excellent water-proof performance and is capable of highly precisely detecting the angle of tilt and the direction of tilt of the operation body of the pointing device. The pointing device has a cylindrical operation body erected on a base. When the base is mounted on the back surface side of the support plate, the operation body protrudes toward the key switch side penetrating through the support plate. The base is mounted on the support plate forming a gap of a size A relative to the support plate, and a water-proof rubber of a predetermined thickness is arranged in the gap of the size A to prevent the water from entering the base side of the pointing device.

7 Claims, 3 Drawing Sheets

KEYBOARD INPUT DEVICE

BACKGROUND OF THE INVENTION

1. Field of the Invention

This invention relates to a keyboard input device forming integrally therein a pointing device which controls the position of a cursor or the like.

2. Description of the Related Art

In a desktop type personal computer, in general, a pointing device such as mouse is placed separately from a keyboard input device requiring, therefore, a space dedicated to the pointing device and, hence, requiring a wide space for installing the desktop type personal computer.

Therefore, there has been proposed a keyboard input device by integrally mounting a pointing device on a support plate on which a plurality of key switches are mounted.

In such an integral pointing device, a cylindrical operation body is erected on a central portion of a plate-like base and a plurality of distortion sensors are mounted surrounding the operation body.

Further, a support plate having a plurality of key switches mounted on the front surface thereof is provided with a plurality of cylindrical mounting rods erected downward on the back surface thereof. The base of the pointing device is mounted on the lower ends of the mounting rods while permitting the operation body to penetrate through to the surface side of the support plate.

On one surface of the base, there are arranged a plurality of distortion sensors capable of detecting distortion of the base. When the base undergoes the distortion due to the operation for tilting the operation body, the distortion is detected by the distortion sensors. Desired coordinates can, then, be input being corresponded to the amounts of distortion detected by the distortion sensors.

The above keyboard input device integral with the pointing device offers such advantages that a decreased area of installation is required and that the device can be easily carried, and is, hence, finding increasing demands in a field where decreasing the size is essential as represented by portable personal computers.

In the pointing device of the above keyboard input device, however, the base is mounted on the mounting rods erected downward from the support plate forming a gap between the support plate and the base.

Therefore, if the operator accidentally spills water droplets or the like liquid on the support plate during use, then, the water droplets fail on various electronic parts arranged under the base infiltrating through the gap causing the quality of the electronic parts to deteriorated.

Besides, the pointing device has the distortion sensors arranged on one surface of the plate-like base. Therefore, when the operation body is tilted, the portions of the base mounting the neighboring distortion sensors interfere with each other, making it difficult to highly precisely detect the direction in which the operation body is tilted or the amount of tilt, arousing a problem of decrease in the sensitivity of the distortion sensors.

SUMMARY OF THE INVENTION

This invention was accomplished in view of the above problems and has an object of providing a keyboard input device equipped with a pointing device featuring excellent water-proof performance and is capable of highly precisely detecting the angle of tilt and the direction of tilt of the operation body of the pointing device.

As a first means for solving the above problem, this invention provides a keyboard input device comprising a plurality of key switches, a support plate for supporting the key switches maintaining the freedom of operation thereof, and a pointing device mounted on the back surface side of the support plate, the pointing device having a plate-like base, a cylindrical operation body erected on the base and a plurality of sensors arranged on one surface of the base to detect the direction of tilt and the angle of tilt of the operation body;

the pointing device permitting an end of the operation body to protrude toward the side of the key switches penetrating through the support plate, and having a water-proof rubber of a predetermined thickness arranged between the base and the support plate; wherein when the base is mounted on the support plate with the water-proof rubber being held between the base and the support plate, the water-proof rubber is pushed on the back surface side thereof onto the base and is intimately adhered on the front surface thereof onto the support plate.

As a second means for solving the above problem, a cap covering the end is fixed to the operation body that penetrates through the support plate, and when the base is mounted on the support plate in a state where the water-proof rubber is held between the base and the support plate, the water-proof rubber is pushed on the back surface side thereof onto the base and is intimately adhered on the front surface thereof onto the lower end surface of the cap.

As a third means for solving the above problem, the sensors are arranged on four places of the base along the same circle with the operation body as a center and meeting in a crossing manner, and the water-proof rubber is partly pushed onto the base among the sensors at positions separated away from the sensors.

As a fourth means for solving the above problem, a base plate of a predetermined thickness is arranged on the back surface side of the water-proof rubber, and the water-proof rubber is partly pushed onto the base via the base plate.

As a fifth means for solving the above problem, spacer members having a predetermined thickness and a size are arranged on four places of the base among the sensors and at positions separated away from the sensors, the spacer members pushing the back surface side of the base via the base plate.

As a sixth means for solving the above problem, the sensors are forming slits for partly isolating the neighboring sensors from each other.

As a seventh means for solving the above problems, a mounting plate of a predetermined height is arranged on the outer periphery of the water-proof rubber between the support plate and the base, and the base is mounted on the support plate via the mounting plate by using a plurality of mounting screws introduced from above the support plate among the plurality of key switches.

DESCRIPTION OF THE PREFERRED EMBODIMENTS

Figure 1:
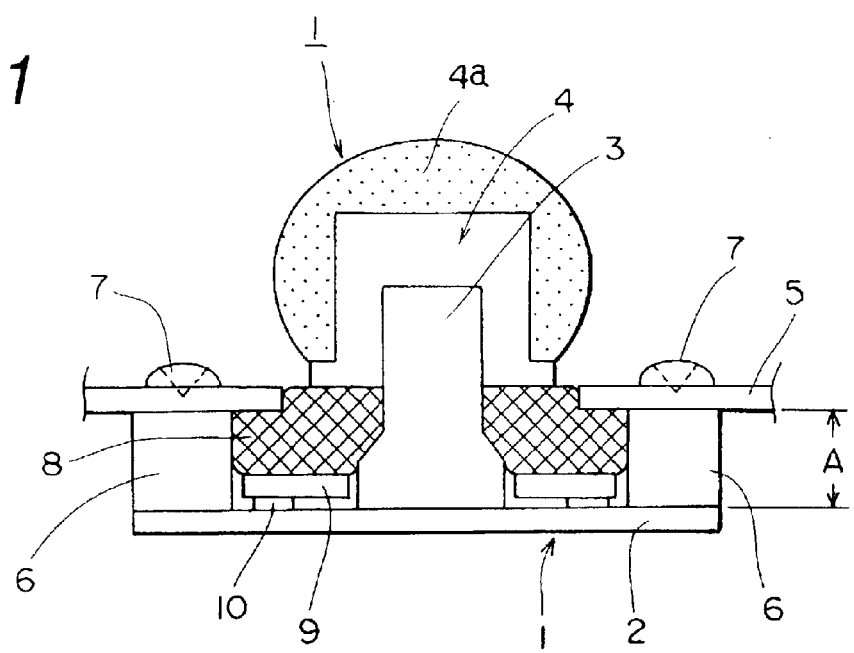
FIG. 1 is a sectional view illustrating a major portion of the structure for mounting a pointing device according to the invention.
Figure 3:
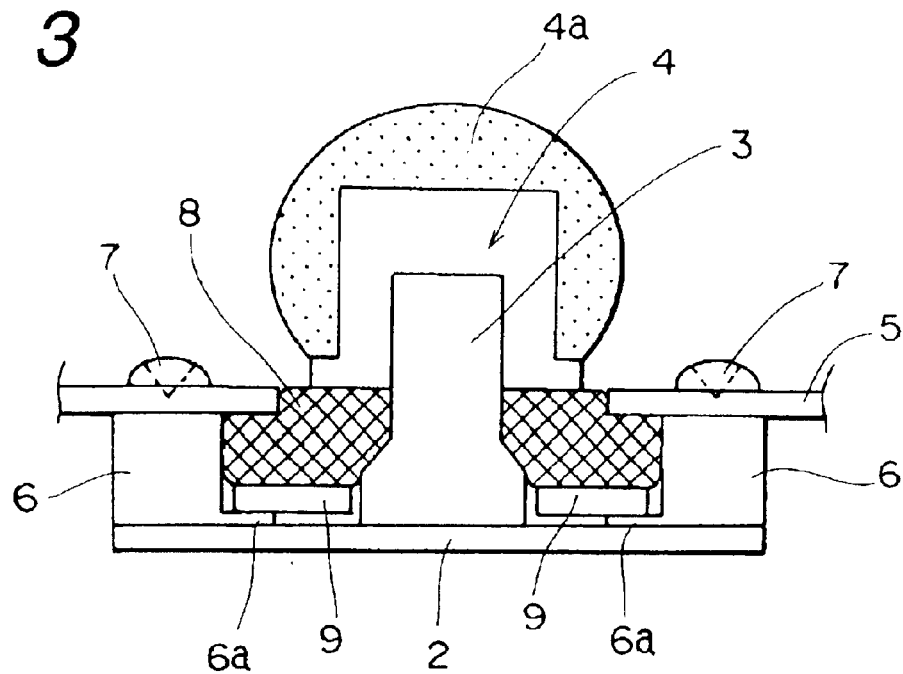
FIG. 3 is a sectional view illustrating a major portion of a modified example for mounting the pointing device according to the invention.
Figure 4:
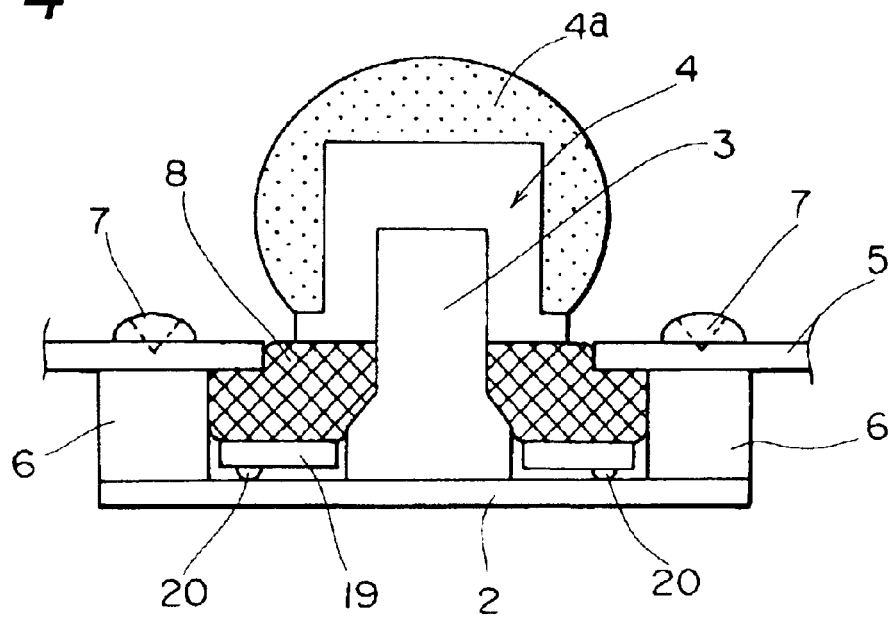
FIG. 4 is a sectional view illustrating a major portion of another modified example for mounting the pointing device according to the invention.
Figure 5:
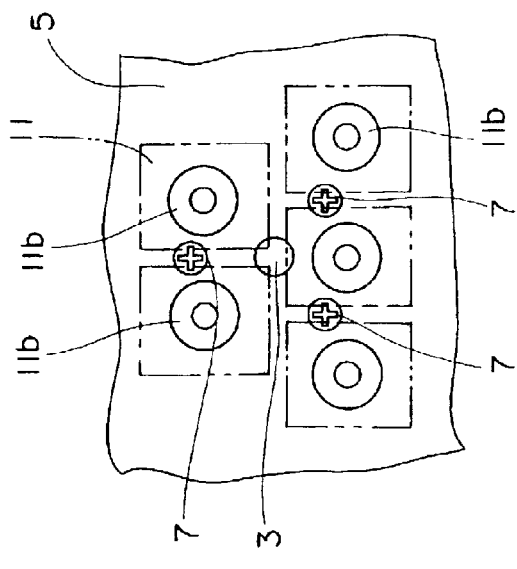
FIG. 5 is a plan view of a major portion illustrating a position for mounting the pointing device according to the invention.
Figure 6:
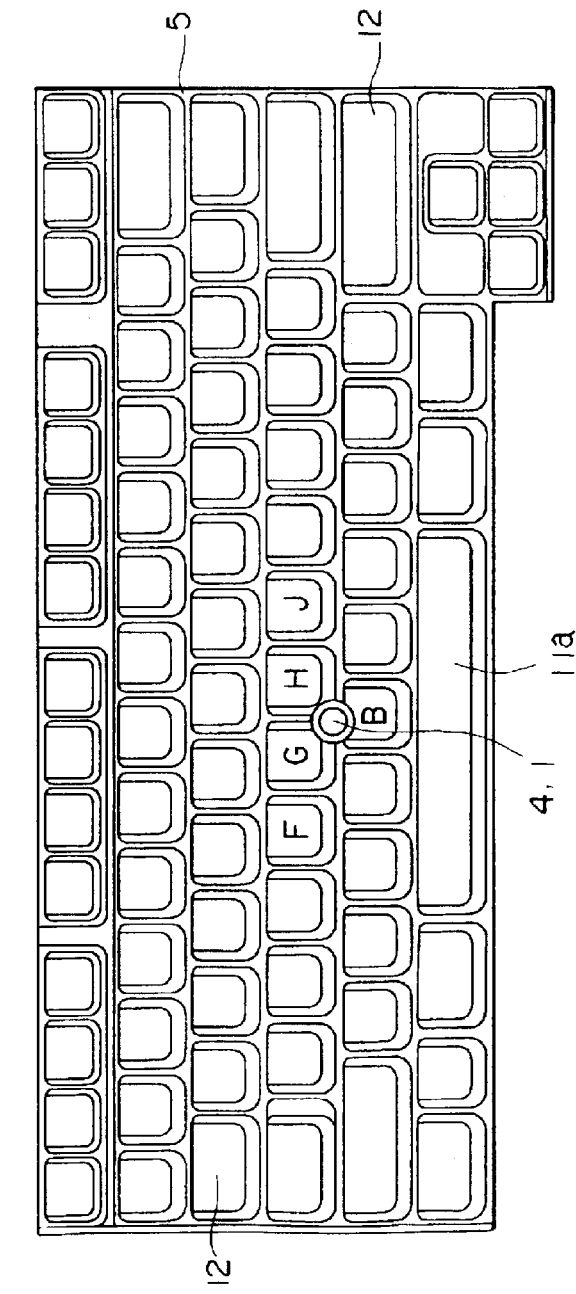
FIG. 6 is a plan view of a keyboard device according to the invention.

A keyboard device of the invention will now be described with reference to the drawings. FIG. 1 is a sectional view illustrating a major portion of the structure for mounting a pointing device according to the invention, FIG. 2 is a plan view of the pointing device according to the invention, FIGS. 3 and 4 are sectional views illustrating a major portion of modified examples for mounting the pointing device according to the invention, FIG. 5 is a plan view of a major portion illustrating a position for mounting the pointing device according to the invention, and FIG. 6 is a plan view of a keyboard device according to the invention.

Figure 2:
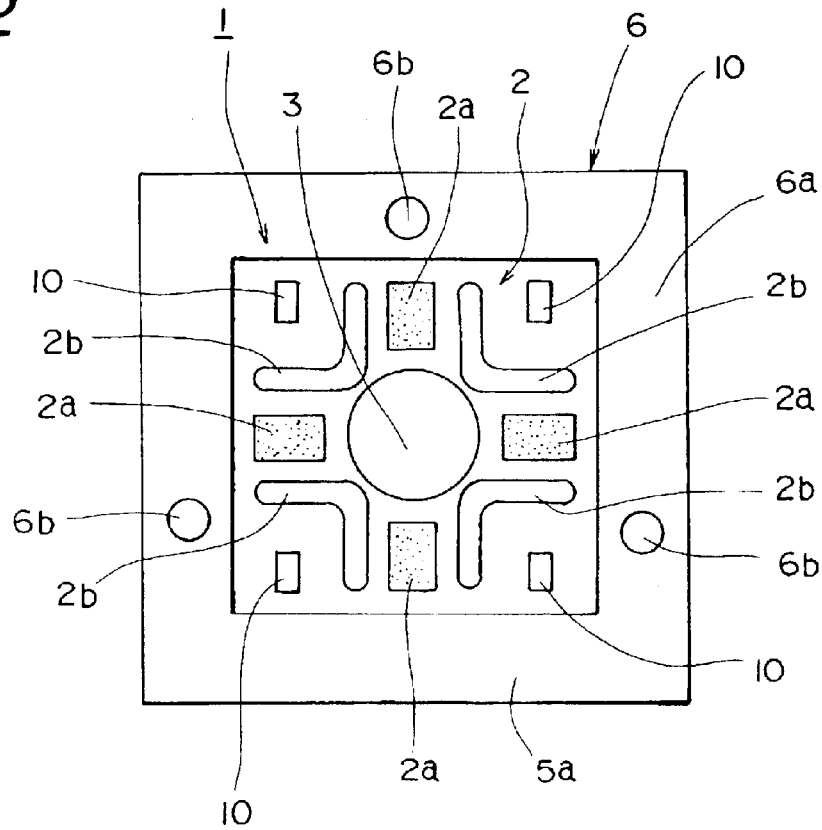
FIG. 2 is a plan view of the pointing device according to the invention.

Referring, first, to FIGS. 1 and 2, a pointing device 1 related to a keyboard input device of this invention has, at a lower portion thereof, a rectangular base 2 of the shape of a plate. A cylindrical operation body 3 is erected upward on a central portion of the base 2.

On the front surface of the base 2, there are formed first to fourth sensors 2a comprising resistor patterns having a predetermined resistance at four places on the same circle with the operation body 3 as a center and meeting in a crossing manner.

Further, nearly L-shaped slits 2b are formed in the base 2 to partly isolate the neighboring sensors 2a from each other.

A cap 4 made of a hard resin or the like is forcibly fixed to an upper end of the operation body 3. An anti-slipping member 4a is removably mounted on the cap 4 to prevent the slipping when the pointing device 1 is operated by fingers.

Further, a support plate 5 made of an aluminum plate or the like plate is arranged on the keyboard input device of this invention to support a plurality of key switches 11 that will baseescribase later maintaining the freedom of operation thereof.

The pointing device 1 is mounting the base 2 by using three mounting screws 7 introduced from above the support plate 5 via the mounting plate 6.

The mounting plate 6 has peripheral side walls 6a of a height A, and has mounting holes 6b formed at three places in the side walls 6a permitting the mounting screws 7 to pass through.

The mounting plate 6 is positioned on the back surface of the support plate 5, and is secured to the base 2 using the screws 7 introduced from above the support plate 5, such that the pointing device 1 is mounted on the support plate 5.

An elastic water-proof rubber 8 is arranged in the gap of a size A between the base 2 and the support plate 5. The water-proof rubber 8 is made of an elastic member such as urethane rubber or sponge, and has a thickness smaller than the size A, enabling a predetermined gap to be formed relative to the base 2.

A base plate 9 made of a resin such as PET and having a thickness of nearly 0.3 mm is arranged on the back surface of the water-proof rubber 8.

The pushing force of the base 2 is evenly imparted to the back surface of the water-proof rubber 8 through the base plate 9.

Four spacer members 10 having a predetermined thickness and a size are stuck with an adhesive to the surface of the base 2 under the base plate 9. The spacer members 10 are stuck onto the base 2 on the outer side of the slits 2b among the sensors 2a and at positions away from the sensors 2a.

The spacer members 10 work to push the back surface of the water-proof rubber 8 via the base plate 9.

Therefore, when the base 2 is mounted on the support plate 5 by screws 7 via the mounting plate 6, the water-proof rubber 8 is pushed on the back surface side thereof onto the base 2 and is intimately adhered on the front surface side thereof to the support plate 5 preventing the infiltration of water between the support plate 5 and the water-proof rubber 8.

At the same time, the water-proof rubber 8 is intimately adhered on the front surface side thereof to the lower end surface of the cap 4 preventing the infiltration of water between the cap 4 and the water-proof rubber 8.

Therefore, even water droplets accidentally spilt from above the pointing device 1 are prevented by the water-proof rubber 8 from infiltrating into the pointing device 1. Water droplets do not fall onto the electronic parts under the base 2, as a matter of course.

To operate the pointing device 1, the operator exerts load on the cap 4 in a tilted direction by fingers to tilt the operation body 3. Then, the base 2 of a portion surrounded by slits 2b is locally distorted, and the resistances of the sensors 2a undergo a change due to the distortion.

The change in the resistance is input to a control unit (not shown) comprising a CPU or the like. Depending upon the change in the resistance, the control unit operates, for example, the direction in which the cursor moves, the amount of movement or the moving speed, and causes the cursor to move based upon the operated results.

In the keyboard input device of this invention as shown in FIG. 6, further, the cap 4 of the pointing device 1 mounted on the support plate 5 is protruding upward by a predetermined amount from a place between the home position keys F and J among the plurality of key switches 11 or, concretely, from a place surrounded by the key tops of three key switches 11 of G, H and B just over the space key 11a.

The key switches 11 have hollow dome-like rubber springs 11b which are each attached by three mounting screws 7 introduced from above the support plate 5.

Therefore, the key switches 11 can be fastened by screws from the same direction as the mounting direction facilitating the assembly.

The thus arranged pointing device 1 is operated by applying a tilting load to the cap 4 with a first finger while operating the key top of the key switch 11 with a finger of the operator. Then, the operation body 3 is tilted, and the cursor on the display (not shown) is moved to a predetermined position.

In the embodiment of the invention, further, the elastic member 8 is pushed by four spacer members 10 arranged on the base 2 via the base plate 9. As a modified example shown in FIG. 3, however, it is also allowable to form extended portions 6a in the gap between the base plate 9 and the base 2 by extending portions of the mounting plate 5, and to push the water-proof rubber 8 by the extended portions 6a via the base plate 9.

As another modified example shown in FIG. 4, further, portions of the base plate 19 may be protruded by a predetermined amount as shown in FIG. 4 to thereby form four protruded portions 20.

The protruded portions 20 are brought into pressed contact with the base 2 at positions on the outer side of the slits 2b among the sensors 2a and away from the sensors 2a.

In the pointing device according to the invention, the water-proof rubber having a predetermined thickness is arranged between the base and the support plate, and the base is mounted on the support plate in a state where the water-proof rubber is held between the base and the support plate. Then, the water-proof rubber is pushed on the back surface side thereof onto the base and is intimately adhered on the front surface side thereof to the support plate. Accordingly, leakage of water is reliably prevented between the support plate and the water-proof rubber. Even in case water is accidentally spilt from above the support plate, the water does not infiltrate into the pointing device or into the electronic parts arranged thereunder, and the keyboard input device maintains a high quality.

When the base is mounted on the support plate, further, the water-proof rubber is pushed on the back surface side thereof onto the base and is intimately adhered on the front surface side thereof to the lower end surfaces of the cap, reliably preventing the leakage of water between the cap and the water-proof rubber.

Further, since the back surface side of the water-proof rubber is partly pushed onto the base among the sensors at positions separated away from the sensors, the sensors are little affected by the distortion in the pushing portions. Therefore, the sensors are allowed to highly sensitively detect the distortion of the base of when the operation body is tilted.

The base plate having a predetermined thickness is arranged on the back surface side of the water-proof rubber, and the water-proof rubber is partly pushed onto the base via the base plate. Accordingly, the water-proof rubber is evenly adhered to the support plate and to the cap due to the base plate, making it possible to more reliably prevent the infiltration of water.

Further, the spacer members having a predetermined thickness and a size are arranged on four places of the base among the sensors at positions separated away from the sensors, and the spacer members work to push the base via the base plate. Therefore, even when the base is distorted at portions where the spacer members are arranged, the base is little affected by the portions where the sensors are arranged, and the sensors exhibit high sensitivity.

Further, slits are formed among the sensors to partly isolate the neighboring sensors from each other. Therefore, the sensors maintain high sensitivity.

Further, the base is mounted on the support plate by using a plurality of mounting screws introduced from above the support plate via the mounting plate among the plurality of key switches. Therefore, the screws can be tightened from the same direction as the direction in which the key switches are mounted on the support plate, and there is provided a keyboard device that can be favorably assembled.

What is claimed is:

1. A keyboard input device comprising a plurality of key switches, a support plate for supporting the key switches maintaining freedom of operation thereof, and a pointing device mounted on a back surface side of the support plate, the pointing device having a plate-like base, a cylindrical operation body erected on the base and a plurality of sensors arranged on one surface of the base to detect a direction of tilt and an angle of tilt of the operation body;

the pointing device permitting an end of the operation body to protrude toward the side of a key switches penetrating through the support plate, and having a water-proof rubber of a predetermined thickness arranged between the base and the support plate; wherein when the base is mounted on the support plate with the water-proof rubber being held between the base and the support plate, the water-proof rubber is pushed on the back surface side thereof onto the base and is intimately adhered on a front surface thereof onto the support plate.

2. A keyboard input device according to claim 1, wherein a cap covering the end of the operation body is fixed to the operation body that penetrates through the support plate, and when the base is mounted on the support plate in a state where the water-proof rubber is held between the base and the support plate, the water-proof rubber is pushed on the back surface side thereof onto the base and is intimately adhered on the front surface thereof onto a lower end surface of the cap.

3. A keyboard input device according to claim 1, wherein the sensors are arranged on four places of the base along the same circle with the operation body as a center and meeting in a crossing manner, and the water-proof rubber is partly pushed onto the base among the sensors at positions separated away from the sensors.

4. A keyboard input device according to claim 1, wherein a base plate of a predetermined thickness is arranged on the back surface side of the water-proof rubber, and the water-proof rubber is partly pushed onto the base via the base plate.

5. A keyboard input device according to claim 1, wherein spacer members having a predetermined thickness and a size are arranged on four places of the base among the sensors and at positions separated away from the sensors, the spacer members pushing the back surface side of the base via the base plate.

6. A keyboard input device according to claim 1, wherein the sensors are forming slits for partly isolating the neighboring sensors from each other.

7. A keyboard input device according to claim 1, wherein a mounting plate of a predetermined height is arranged on an outer periphery of the water-proof rubber between the support plate and the base, and the base is mounted on the support plate via the mounting plate by using a plurality of mounting screws introduced from above the support plate among the plurality of key switches.

* * * * *